Patented Apr. 18, 1950

2,504,471

UNITED STATES PATENT OFFICE 2,504,471

SULFANILIC ACID DERIVATIVES

Harold Urist and Gustav J. Martin, Philadelphia, Pa., assignors to The National Drug Company, Philadelphia, Pa., a corporation of Pennsylvania No Drawing. Application February 21, 1948, Serial No. 10,199

3 Claims. (Cl. 260—251)

Our invention relates to new chemotherapeutic agents. It is particularly concerned with the novel compound N-[(2,4-dihydroxy-6-pteridyl)-methyl] sulfanilic acid and its salts, as well as a method for preparing the same.

Our novel compound possesses the following structural formula:

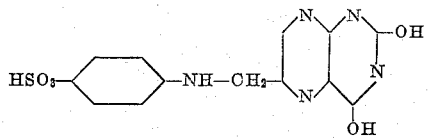

We have found that this sulfonic acid and its salts possess valuable antibacterial properties. They are highly effective against pathogenic bacteria. Their activity in this respect appears to be due to their ability to displace folic acid, a member of the vitamin B complex. This displacing action of our new compounds could not have been foretold, since they contain a sulfonic acid or sulfonate group and are devoid of the glutamic acid radical that forms a substantial part of the folic acid structure. Furthermore, they contain a hydroxy group in the 2-position on the pteridyl radical in place of the amino group present there in the folic acid.

Our new compounds may be taken orally, injected intravenously, or incorporated in an ointment and applied externally. The acid itself is insoluble in water, but it may readily be converted into its water-soluble, alkali metal salts by treatment with caustic alkalies. Other salts may be prepared from the free acid in a conventional manner by neutralizing such acid with suitable bases.

Our new chemotherapeutic agents may be prepared by a process comprising the condensation of sulfanilic acid, acrolein dibromide, and 5,6-diaminouracil. This condensation is preferably effected in a buffered aqueous solution at room temperature. All three reaction materials may be condensed simultaneously or the condensation may be effected in two stages without the necessity of isolating the intermediate formed. Generally we employ approximately equimolecular proportions of the three reactants, although in some cases we have found it advantageous to employ an excess of the acrolein dibromide and/or the 5,6-diaminouracil. For example, 2 moles each of these reactants may be employed for each mole of the sulfanilic acid. In place of the free 5,6-diaminouracil, one may also use its salts, such as the bisulfite, dihydrochloride, bisulfate and monosulfite.

The water-insoluble, crude reaction product may be separated from the aqueous reaction mixture by filtration. It may then be purified by refluxing it with methanol, dissolving it in a dilute, aqueous solution of caustic alkali, filtering said solution to remove impurities, and then precipitating the free acid by the addition of a mineral acid to the filtrate. The refluxing with methanol may be omitted, particularly in case an excess of the acrolein dibromide and the 5,6-diaminouracil is used.

The preparation of our new compounds will be better understood upon consideration of the following illustrative example. Obviously our invention is not limited to the specific reactants and reaction conditions set forth therein, as such details may be varied without departing from the spirit of the invention.

Example

A buffered aqueous solution is prepared by mixing 66.9 grams of anhydrous sodium acetate with 54.4 grams of glacial acetic acid and then diluting the mixture with water to form 1 liter of the solution. To 600 cc. of this buffered solution there were added at room temperature 17.3 grams (0.1 mole) of sulfanilic acid, 21.6 grams (0.1 mole) of acrolein dibromide and 33.6 grams (0.1 mole) of 5,6-diaminouracil bisulfate. This mixture was then stirred for 5 hours at room temperature and allowed to stand overnight.

On the following morning the brown precipitate which formed was filtered out and dried in the air. The crude product thus obtained was refluxed with methanol, and the insoluble portion collected by filtration and washed with methanol. Said product was then purified by dissolving it in a dilute aqueous solution of sodium hydroxide and reprecipitating it from the solution by the addition of dilute hydrochloric acid. The precipitate so obtained was separated by filtration, washed with dilute hydrochloric acid and dried in the air. In this manner there were obtained 4.0 grams of a brown powder of indeterminate melting point, consisting of the desired N-[(2,4-dihydroxyl-6-pteridyl)methyl] sulfanilic acid. This free acid was readily converted into its salts by neutralization with suitable bases.

We claim:

1. Chemotherapeutic agents comprising a compound selected from the group consisting of N-[(2,4-dihydroxy-6-pteridyl)methyl] sulfanilic acid of the structural formula:

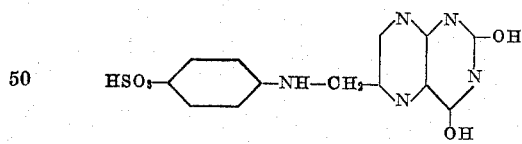

and metal salts thereof.

2. N-[(2,4-dihydroxy-6-pteridyl)methyl] sulfanilic acid.

3. The alkali metal salts of N-[(2,4-dihydroxy-6-pteridyl)methyl] sulfanilic acid.

HAROLD URIST.
GUSTAV J. MARTIN.

No references cited.